United States Patent
Cooper et al.

(10) Patent No.: US 9,305,550 B2
(45) Date of Patent: Apr. 5, 2016

(54) DIALOGUE DETECTOR AND CORRECTION

(76) Inventors: J. Carl Cooper, Incline Village, NV (US); Mirko Vojnovic, Santa Clara, CA (US); Christopher Smith, Simsbury, CT (US)

(*) Notice: Subject to any disclaimer, the term of this patent is extended or adjusted under 35 U.S.C. 154(b) by 1231 days.

(21) Appl. No.: 12/962,551

(22) Filed: Dec. 7, 2010

(65) Prior Publication Data

US 2012/0041762 A1    Feb. 16, 2012

Related U.S. Application Data

(60) Provisional application No. 61/267,393, filed on Dec. 7, 2009.

(51) Int. Cl.
  *G10L 19/005* (2013.01)
  *G10L 15/24* (2013.01)
  *G10L 25/78* (2013.01)

(52) U.S. Cl.
  CPC *G10L 15/24* (2013.01); *G10L 25/78* (2013.01)

(58) Field of Classification Search
  CPC ....... G10L 19/005; G10L 25/78; G10L 25/48; G10L 19/008; G10L 19/167; G10L 19/24; G10L 2025/783; G10L 21/0208; G10L 21/0232; G10L 25/51; G10L 25/93; G11B 27/036; G11B 2020/10601; H04N 5/09; H04S 5/02; G09B 5/065; H04H 20/89; G06F 17/30778; G06F 3/048; G06F 3/162; G06F 3/01; G06F 3/165
  USPC .................. 704/E19.002–E19.004, 236, 258, 704/E17.014, E19.003, E19.005, 500–504
  See application file for complete search history.

(56) References Cited

U.S. PATENT DOCUMENTS

| | | | | |
|---|---|---|---|---|
| 4,792,974 A | * | 12/1988 | Chace | H04R 3/12 369/87 |
| 5,202,761 A | * | 4/1993 | Cooper | H04N 5/04 348/515 |
| 5,576,843 A | * | 11/1996 | Cookson | G09B 5/04 348/E5.111 |
| 5,644,364 A | * | 7/1997 | Kurtze | G11B 27/031 348/584 |
| 6,611,212 B1 | * | 8/2003 | Craven | G11B 20/00992 341/50 |
| 7,188,193 B1 | * | 3/2007 | Getsin et al. | 709/248 |
| 7,424,160 B1 | | 9/2008 | Basse | |
| 8,155,959 B2 | * | 4/2012 | Weng et al. | 704/236 |
| 8,849,432 B2 | * | 9/2014 | Moorer | H04N 21/4223 700/94 |
| 2002/0126703 A1 | * | 9/2002 | Kovacevic | 370/487 |
| 2003/0098926 A1 | * | 5/2003 | Jamie et al. | 348/462 |
| 2003/0142232 A1 | * | 7/2003 | Albean | 348/512 |
| 2004/0100582 A1 | * | 5/2004 | Stanger | 348/515 |
| 2005/0012860 A1 | * | 1/2005 | Cooper | 348/515 |
| 2005/0157883 A1 | * | 7/2005 | Herre | G10L 19/008 381/17 |
| 2005/0219366 A1 | * | 10/2005 | Hollowbush et al. | 348/193 |

(Continued)

*Primary Examiner* — Abdelali Serrou

(57) ABSTRACT

An apparatus and method for tracking dialogue and other sound signals in film, television or other systems with multiple channel sound is described. One or more audio channels which is expected to carry the speech of persons appearing in the program or other particular types of sounds is inspected to determine if that channel's audio includes particular sounds such as MUEVs, including phonemes corresponding to human speech patterns. If an improper number of particular sounds such as phonemes are found in the channel(s) an action such as a report, an alarm, a correction, or other action is taken. The inspection of the audio channel(s) may be made in conjunction with the appearance of corresponding images associated with the sound, such as visemes in the video signal, to improve the determination of types of sounds such as phonemes.

30 Claims, 3 Drawing Sheets

(56) References Cited

U.S. PATENT DOCUMENTS

| | | |
|---|---|---|
| 2005/0253965 A1* | 11/2005 | Cooper .................... 348/515 |
| 2005/0286727 A1* | 12/2005 | Otsuka .................. H04R 5/02 381/18 |
| 2006/0015348 A1* | 1/2006 | Cooper et al. ............... 704/500 |
| 2006/0078305 A1* | 4/2006 | Arora .................. G11B 27/10 386/201 |
| 2006/0290810 A1 | 12/2006 | Mallinson |
| 2007/0092089 A1* | 4/2007 | Seefeldt et al. ............. 381/104 |
| 2007/0153089 A1 | 7/2007 | Cooper et al. |
| 2007/0153125 A1* | 7/2007 | Cooper et al. ............... 348/515 |
| 2008/0008323 A1* | 1/2008 | Hilpert ................ G10L 19/008 381/1 |
| 2008/0079851 A1 | 4/2008 | Stanger et al. |
| 2008/0175394 A1* | 7/2008 | Goodwin ............... H04S 3/008 381/1 |
| 2008/0253577 A1* | 10/2008 | Eppolito ..................... 381/17 |
| 2009/0030683 A1* | 1/2009 | Williams ..................... 704/236 |
| 2009/0094036 A1* | 4/2009 | Ehlen et al. ................ 704/270.1 |
| 2009/0164221 A1* | 6/2009 | Kim .................... G10L 19/008 704/500 |
| 2009/0252341 A1* | 10/2009 | Goodwin ............... H04S 3/008 381/56 |
| 2010/0145487 A1* | 6/2010 | Oh .................... G10L 19/008 700/94 |
| 2011/0022402 A1* | 1/2011 | Engdegard .............. H04S 7/30 704/501 |
| 2011/0119061 A1* | 5/2011 | Brown ..................... 704/258 |
| 2011/0200196 A1* | 8/2011 | Disch .................... H04S 7/30 381/22 |

* cited by examiner

DIALOGUE DETECTOR AND CORRECTION

RELATED APPLICATION

This application claims the benefit of U.S. Provisional Application No. 61/267,393, filed Dec. 7, 2009, the disclosure of which is incorporated by reference herein.

BACKGROUND

In modern television systems the sound portion of television programs is frequently conveyed with the video signal via multiple channels, for example a typical system could include a video channel and left and right sound channels such as in a stereo television system. The well known intent of using left and right sound channels is to provide a spatially located sound to the viewer whereby sounds created by images at a given location on the television screen are perceived by the viewer as coming from that location.

The corresponding images and sounds are known as mutual events or MUEVs. When the audio and image MUEVs as perceived by the viewer do not properly correspond they are annoying as the sound is perceived to come from a different location than the image making the sound. This is especially true for dialogue (e.g. speech of a person in a one way or two way conversation with another) when the speaker is seen in a different location than the sound comes from. Consider for example a two way conversation between two newscasters, one on the right of the screen and one on the left. If the left and right sound channels are reversed, the right speaker's speech will appear to come from the left side of the screen and vice versa.

In systems including images and sound, it is important that mutual events or MUEVs in audio and video are perceived by the viewer as being spatially aligned. MUEVs are those events in the video and sound which have a high probability of occurring together, for example the instant change of direction of a thrown baseball and the crack of the bat hitting the ball. Other MUEVs include the shape and/or movement of a person's lips and the sound being created. The video lip shapes are referred to as visemes or the visual MUEV and the sounds as phonemes or the sound MUEV. MUEVs however are not just visemes and phonemes but encompass simultaneously occurring events which have a probability of being related, such as the above baseball direction and bat crack example.

In other systems, both audio only, for example such as radio and audio video, for example such as television, it is desired to convey dialogue in a particular channel or channels. Because sound signals in modern audio only and audio video acquisition and production systems are frequently recorded and carried by multiple sound channels, there is a possibility of the dialogue being misplaced, that is of the dialogue being carried by the wrong audio channel. It is also possible for dialogue to be lost entirely, for example when sound is acquired via a sound effects channel which is subsequently discarded.

As used in this specification and claims, If a system sound channel conveys the proper sound signal (e.g. dialogue in the proper channel(s) and/or leading the viewer to perceive sounds as properly corresponding to the image location), the sound channel or signal is said to (properly) track and if it does not convey the proper sound signal the channel or signal is said to mistrack. For example, if the left and right sound channel signals are reversed, that is the left channel carries the right sound signal and vice versa (sometimes called swapping), the sound signals mistrack. If the dialogue sound signal is missing from the dialogue sound channel(s), the sound signal mistracks.

As another example of multiple channel sound systems, the sound of the performers in the television program is conveyed via left and right sound dialogue channels whereas sound effects such as music and other non speech sounds are conveyed by left and right sound effects channels. Another example is 5.1 channel sound, sometimes referred to as 3-2 stereo, with a center dialogue channel, front left and right dialogue channels, rear left and right effects channels, and a low frequency effects channel.

Yet another example of a multiple channel sound system is the Japan Broadcasting Corporation (NHK) experimental Super Hi-Vision television having 22.2 sound channels. These channels are grouped relative to the viewer as 9 above the ear, 10 ear level, 3 below the ear and 2 low frequency effects channels. The various sound channels surround the viewer to provide a highly realistic audio sensation where the sound can be perceived as coming from anywhere within about 300 degrees vertically and 360 degrees horizontally, depending on the location of the viewer relative to the sound transducers (e.g. speakers).

Due to widespread audio processing, for example program conversion between different sound systems, and other problems such as poor microphone placement, incorrect wiring, equipment failures and operator error, the sound signals often find their way into the wrong sound channels. For example having the dialogue carried in the wrong channel can cause problems for the viewer ranging from annoying sound to loss of dialogue audio.

For example if the left and right channels in a two channel system are reversed the location of the sound does not match the location of the image, such as when a person on the left of the image frame is talking but the sound comes from the right sound transducer (speaker). As another example consider the NHK system where the sound which the viewer perceives is intended to come from various directions around the viewer including from ear level, higher and lower directions to correspond to the images which are displayed to the viewer (or previously or about to be displayed to the viewer). In this system if a sound signal is placed in the wrong channel various annoying effects can occur, such as a speaking person located to the viewer's lower right being heard behind, above, to the left or in some other direction different from where the viewer sees the image of the person speaking.

Also, it is important that sound that corresponds to images not displayed to the viewer or not yet or previously displayed to the viewer, be in the correct channel. For example consider a television scene of a person in the middle of the frame carrying on a conversation with an unseen person to the right side. If the center dialogue channel and the right front channel are reversed the conversation will appear unnatural.

As another example consider a television program conveys an airplane flying at low level from behind the viewer, to above the viewer and on to be displayed in front of the viewer. The sound will start from behind, progress to above and further progress to in front of the viewer. In this instance the sound from behind and from above will correspond to an image not yet seen by the viewer. Of course the opposite will happen if the aircraft is flying from the front of the viewer to behind the viewer. In this instance the sound from above and behind the viewer corresponds to an image previously displayed.

In all situations it is important to have the sound perceived by the viewer as corresponding to the location of the image creating the sound i.e. tracking the image location. This is true even when the image is not currently displayed. This is true even if the image is in a location that is not being displayed at the instant, such as behind the viewer.

It is of course possible that the image is never displayed but nevertheless the sound signals need to track. As an example similar to that above, consider a conversation between two people, one located in front of the viewer and seen on the image frame, the other located behind the viewer, walking from side to side, and never seen. If the second person's sound signal mistracks, the viewer could hear the sound from behind and to the viewer's right whereas he would see the first person looking toward the viewer's left. If the unseen person were walking about as he talked, the viewer would see the first person following the unseen person but if the unseen person's sound signals mistrack the visual signal and audio cues to the unseen person's location would be inconsistent.

In television, film and other systems which provide images to the viewer in more than one direction, such as wide screen (e.g. 16×9), specialized surround projection systems (e.g. IMAX), or systems providing images in three dimensional or simulated three dimensional systems (e.g. 3D-TV) it is likewise important that the sound matches the viewer's perceived image location. When the sound is not present in the correct sound channel this perception is negatively affected. Mistracking sound signals will cause conflicting audio and visual cues which can be annoying to the viewer.

As another example of problems with sound not being in the proper channel, when the dialogue audio is carried in the wrong channel or not carried in all the proper channels, a loss of dialogue can occur, for example when the television program is passed through equipment which is incapable of handling all of the audio channels and those containing dialogue are discarded. Such is the case when a television program having center, left and right dialog channels and rear effects channels is passed through an audio signal processing device that can only handle left and right dialogue channels. If the sound is only located in the center dialog channel and the audio signal processing device discards or otherwise never utilizes the center channel, the dialogue that was only in the center channel will be lost. Generally whenever there is a mistracking sound signal there is a risk of important sounds being lost.

In the prior art it is known to detect the presence of audio in one or more audio channels and sound an alarm if the channel is silent for a predetermined period of time. One such system is described by Basse in U.S. Pat. No. 7,424,160 wherein in FIG. 7 the flow diagram of an audio silence detector is shown. Basse's system does not distinguish the type of audio which is present and consequently missing dialogue in a dialogue channel which is carrying sound effects would not cause Basse's invention to catch the problem.

Basse does mention that system operators desire to monitor their systems to ensure quality audio and video reaches the viewers and relates prior systems such as cable TV systems where employees monitored the quality. Basse also points out that the cost of hiring employees to monitor every channel in a system can be expensive and notes several problems with utilizing employees to monitor modern systems consisting of as many as 800 TV channels.

Generally, as Basse suggests, in television, film and other systems using multiple channel sound it is desirable to have a human operator monitor the sound to ensure that each sound signal has been properly assigned to its corresponding channel. As the number of sound channels increases the task of monitoring becomes more difficult and as the number of systems to be monitored, such as in the aforementioned 800 TV channel systems, the number of operators required for proper monitoring increases dramatically.

Typically, due to the costs involved, proper dialogue presence and spatial sound location monitoring is not performed in modern systems. The monitoring task falls to a single operator who performs occasional checking. The use of occasional checking leads to errors not being discovered promptly and in some systems they may not be discovered for an entire program.

What is needed is an automated system which can monitor particular sound types such as dialogue to ensure it is carried properly and monitor sound's spatial location to ensure it properly matches the corresponding video location.

DETAILED DESCRIPTION

The inventive concepts disclosed herein provide an automated system and method for monitoring, reporting and correcting the above described single and multiple channel sound errors caused by one or more instances of a wrong or no particular type of sound signal (as distinguished from no sound at all) being conveyed in a sound channel.

The embodiment of the present invention includes detection of tracking or mistracking of one or more particular type of sound signals in a single or multiple channel sound only or sound and image system.

Of course, one of ordinary skill may practice the present invention in apparatus and methods which may combine the inventive concepts known from the description herein along with indiscriminate detection of the presence of any sound in a particular channel or channels.

The description of various embodiment of the present invention also includes detection of tracking or mistracking of one or more sound signals in a system including multiple channel sound signals and a corresponding image signal. Corresponding sounds and images, for example MUEVs, may be utilized to determine if a particular sound signal is carried by the proper sound channel(s) such that the sound MUEVs match the image MUEVs in viewer perceived spatial location. It may also be determined if particular types of sound MUEVs are being carried by the intended channel(s) in a system or otherwise correctly carried and presented to the viewer.

In one exemplary embodiment phonemes corresponding to dialogue are detected in one or more sound signals conveyed by one or more channels and the appropriateness of the detected phonemes being present in the sound channel is determined. When an inappropriate presence (or absence) of phonemes is determined an action such as one or more of a report, an alarm or a correction is performed.

The exemplary embodiment includes making the determination of the appropriateness of the presence (or absence) of phonemes in one or more sound channel in response to past, current and/or future images such that the location of the sound may match the location of the particular image creating the sound.

The exemplary embodiment of the invention includes the ability to automatically correct errors by switching one or more sound signal from one sound channel to another in response to the determination of the appropriateness of a sound signal being conveyed in a sound channel.

Figure 1:
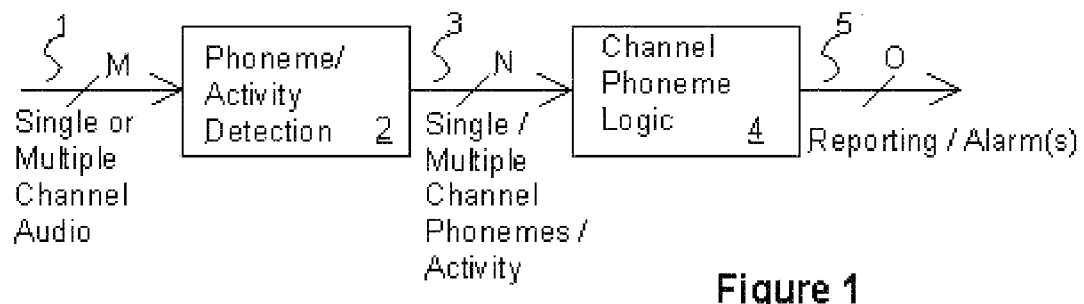
FIG. 1 is a diagram of an embodiment of the invention utilized for detecting the loss of proper tracking in a single or multiple channel audio system.

FIG. 1 shows a diagram of one exemplary embodiment of the present invention as utilized for detection of the loss of proper tracking in a single or multiple channel audio system. The audio system may be audio only, audio and video or otherwise as will be known from the present teachings. One or more audio signals of the M audio channel(s) 1 is coupled to a phoneme/activity detector 2 which operates to identify activity and the occurrence of phonemes in that audio signal. The detector 2 outputs phoneme signal(s) and channel activity signal(s) (or alternatively information corresponding to the detected phonemes and activity) for each of the M audio channels to channel phoneme logic 4 via N signals 3. Channel phoneme logic 4 operates to determine if the channel activity and/or phonemes are proper for the particular channel(s) and thus whether the corresponding input audio signal properly tracks. It will be appreciated that the absence of a loss of proper tracking is a confirmation of proper tracking.

The description of the exemplary embodiment given herein will now generally be given with respect to multiple audio channels as well as in respect to audio video systems. It will be understood that the descriptions of the exemplary embodiment will also be applicable to single channel as well as audio only applications.

Upon determination of the tracking (or lack thereof) that determination is reported for each desired channel and if desired an alarm is generated, via O signals 5. It may be noted that while it is preferred to detect both phoneme and activity in the audio signal, that a lack of activity may be inferred from a lack of phonemes and vice versa thus that inference may be relied on in lower performance systems. In particular the activity detection may be omitted if desired to save costs. While phonemes and activity are detected and utilized for dialogue tracking correction, the current invention may detect audio characteristics other than the above mention phonemes and activity. For example, the audio MUEV discussed below may be used as audio characteristics for the current invention, where the audio MUEV may include non-phoneme sounds such as applause which is commonly found in audio dialogue. The audio characteristics in this specification include phonemes, activity, and non-phoneme sound.

The phoneme detection which is utilized in 2 may be that disclosed in U.S. Patent Application 20070153089. Alternatively the mouth sound or audio MUEV detection disclosed in U.S. Pat. No. 7,499,104 may be utilized to detect particular mouth sounds or MUEVs which are appropriate for a given audio channel. It is preferred that the output 3 indicates MUEVs which are appropriate for the expected type audio signal corresponding to the audio channel being monitored. For example, if the audio channel being monitored is a center dialogue channel, then detection of audio MUEVs such as phonemes corresponding to vowels A, E, and O is performed since these should be frequently found in the center dialogue channel. Other phonemes may be detected as well, for example the sounds M, P, B, N and S. The detection of such phonemes is described in U.S. Patent Application 20070153089. Note that these phonemes are also MUEVs in that they will correspond to visual images and in particular the shape of the lips of the speaker, as will be discussed below with respect to FIGS. 4 and 5.

Activity may be detected by the presence of a known number of one or more types of phonemes, or may be otherwise determined as is known in the prior art. For example an inspection of the audio signal may be performed to determine if there is significant energy in frequency bands corresponding to those normally carrying voice sounds may be utilized. Such a system is described for example in U.S. Pat. No. 6,836,295 and in particular elements 21-23 of FIG. 2 of the '295 disclosure. The output of elements 23 corresponding to the desired frequency bands will provide an indication of activity for that band.

U.S. Patent Application 20070153089 and U.S. Pat. No. 6,836,295 are incorporated herein by reference in respect to their teachings of methods and apparatus suitable for use in practicing components of the present invention.

As the phonemes (MUEVs) are detected in 2 they are output via 3 to the channel phoneme logic 4. Alternatively information of the detection of the phonemes may be coupled to 4, for example the number of phonemes detected may be reported every second along with a reporting of the presence of audio in the speech frequency range since no MUEVs are to be expected when there is silence or only audio in frequencies where speech is not commonly found.

Channel phoneme logic 4 operates to analyze the presence of activity and phonemes detected by 2 and report the results via 5 to other circuitry or operations. If desired 4 can operate to set an alarm when an insufficient number of phonemes is detected within a given period of time. As an example, if no phonemes are detected by 2 within a 3 minute period when audio is present, an alarm can be set. In the exemplary embodiment it is desired that the operator can set parameters independently for reporting and setting alarms. The exemplary parameters are the number of phonemes and the time duration during which that number are determined. For example reporting parameters can be set to report if fewer than one hundred phonemes are detected within a three minute period and alarm parameters can be set to create an alarm if less than ten phonemes are detected within a five minute period. Other parameters and settings will be known to the person of ordinary skill from the teachings herein. As one other example, parameters may be set for individual phonemes, such as particular ones of vowels, or for groups of phonemes such as vowels and consonants. MUEVs other than phonemes may also be detected, for example applause which is commonly found in audio dialogue channels. A exemplary embodiment of 4 which operates in a somewhat different manner is described with respect to FIG. 2.

Figure 2:
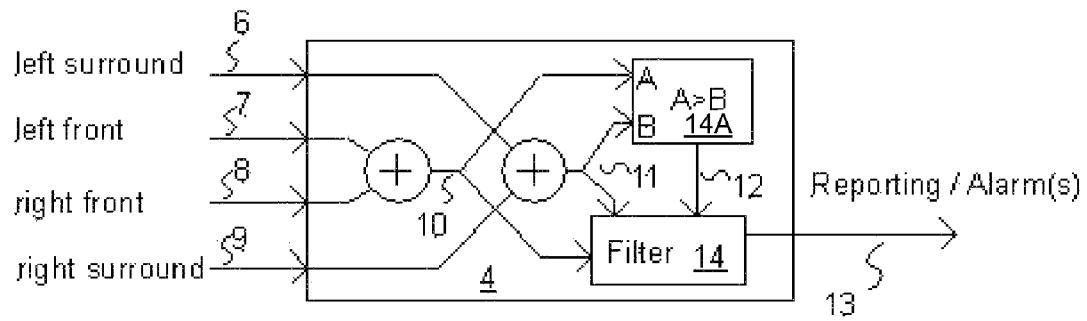
FIG. 2 is a diagram of an embodiment of Channel Phoneme Logic 4 of FIG. 1.

FIG. 2 shows one exemplary embodiment of channel phoneme logic 4 when operated with a four channel sound system having left front 7 and right front 8 and left surround 6 and right surround 9 channels. Normally dialogue is carried by the left and right front channels 7 and 8 and only sound effects are carried by the left and right surround channels 6 and 9. The circuit of FIG. 2 operates to check that dialogue is present in the left and right front channels and not in the left and right surround channels.

In FIG. 2 only phoneme information is provided from 2, activity being inferred from the presence and amount of phonemes. The phoneme input information for dialogue channels 7 and 8 are added to provide combined dialogue information 10 and the phoneme input information for the surround channels is added to provide combined surround information 11. The two combined channels are compared to determine if the dialogue channel phonemes is greater than the surround channel phonemes as should be the case if the four channels are properly tracking. A true output on 12 of the comparison will indicate more phonemes in the left and right front channels than in the surround channels. This true output on 12 in turn indicates proper tracking. If for example the dialogue and surround channels are reversed then the output 12 of the comparison will be false and will indicate the mistracking.

The output 12 is coupled to a filter 14 which operates to reduce or prevent false reporting and alarms which might otherwise happen, for example if there is silence or noise in the front channels or in a momentary presence of dialogue in the surround channels. It is preferred that filter 14 operate as a recursive filter requiring the presence of mistracking signals from 12 for a period of three minutes before reporting or for five minutes before setting an alarm at 13. This recursive filtering in effect provides a running average of the conditions. One skilled in the art will know from the teachings herein to utilize different time periods as well as different operations for 14 to suit particular applications and desired performance tradeoffs.

Filter 14 also operates to inspect the number of phonemes in 10 and 11 and to infer activity from those numbers. If the phoneme numbers are very low in 10 or approximately the same in both 10 or 11 it is likely that 12 may not accurately indicate tracking and reporting and alarms are to be inhibited until the number of phonemes present on 10 or 11 rises above a known amount and remains so for a known period of time. In one exemplary embodiment it is shown that the known amount be ten phonemes within a period of one minute (without recursive filtering). One skilled in the art will know from the teachings herein to utilize different time periods as well as different operations for 14 to suit particular applications and desired performance tradeoffs.

The exemplary embodiment description above is given by way of a simplified example and one of ordinary skill in the art will recognize that there are some fault modes which will not be detected, for example if left surround and left front are swapped it may give roughly equal numbers of MUEVs in 10 and 11. If it is desired to detect such faults each channel should be analyzed individually.

The previous description of the exemplary embodiment operation of 2 and 4 is given by way of example for teaching the inventive concepts of the present invention to the person of ordinary skill in the art. It will be understood that is desirable to include reporting and alarm logic within 14 which will operate as a missing signal detector in order to respond to the absence of audio on 10 or 11. It will also be desirable to inspect each of the input channels individually (without combining) for the presence of sound and phonemes as well as using both phoneme and activity information provided by 2. Such operations will require more complexity but will achieve better detection and reliability, with the implementation of that added complexity being within the skill of one of ordinary skill from the teachings herein.

One of ordinary skill in the art will know to utilize other types and methods of channel phoneme logic for 4 in order to meet particular reporting and alarm requirements of a given application of the invention as will be apparent from the teachings herein. In particular, various of the operations described for 2 and 4 are well suited to implementation with memory such as random access, read only and programmable read only types or in programmable array logic such as that provided by Xilinx and Altera, as well as implementation in a general purpose computer or microprocessor running particular software to convert the general purpose device to a specific device. It is also possible to combine various memory, programmable array logic and software controlled circuitry to practice the invention described herein as will be known to the person of ordinary skill in the art.

The channel phoneme logic 4 of FIG. 2 operates to detect a swapping of dialogue and surround channels and to report and set an alarm in the event of mistracking. In that event it is desirable to correct the mistracking by redirecting the audio signals into the proper audio channel.

Figure 3:
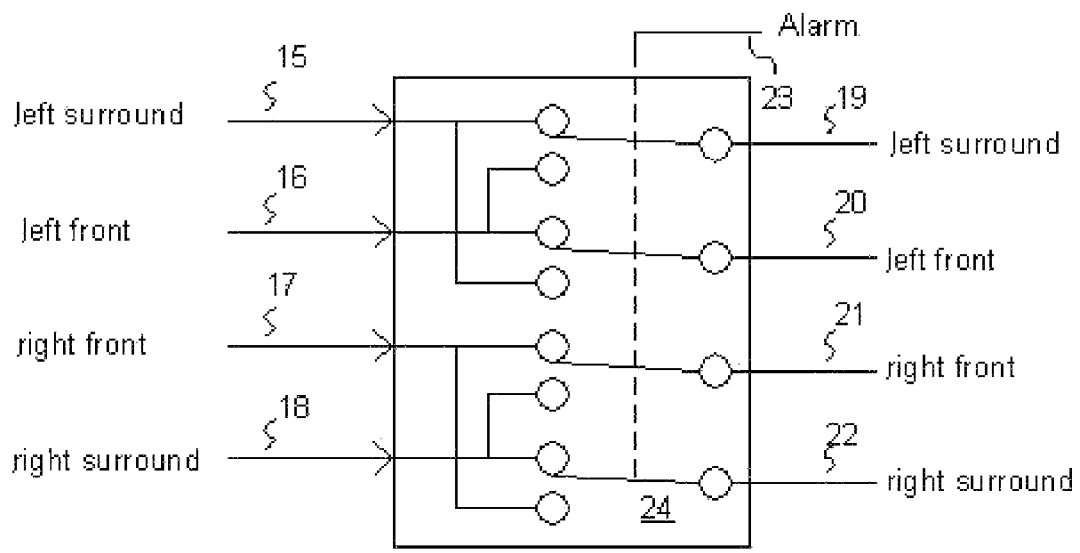
FIG. 3 is a diagram of a circuit to correct mistracking in a multiple channel audio system.

FIG. 3 shows a circuit which performs correction of mistracking when dialogue and surround channels are swapped. The left surround 15, left front 16, right front 17 and right surround 18 signals are coupled to a four pole double throw switch 24 which is responsive to the alarm 23 from 4. In the switch normal position shown the input signals 15-18 are output as the same signals left surround 19, left front 20, right front 21 and right surround 22. When a mistracking is detected by 4 an alarm 23 is set and the switch 24 is caused to move to the other position thus returning the mistracked audio signals to their proper channels.

As described above there are systems which provide multiple channel audio where it is desirable to inspect the audio in respect to the corresponding images to ensure that the sound properly tracks the images. For example when an actor is located on the left of the image frame the sound of that actor should be carried by the left sound channel.

Figure 4:
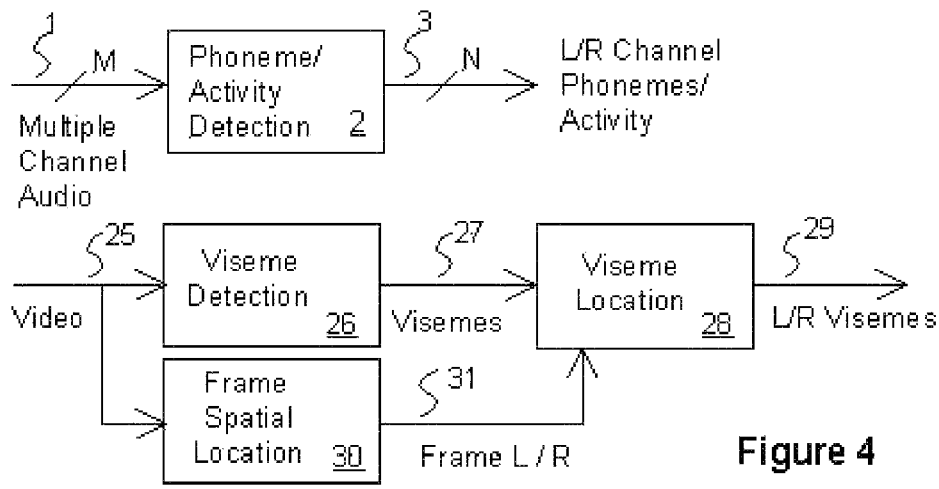
FIG. 4 is a partial diagram of an embodiment of the invention utilized for detecting the loss of proper tracking in a system having multiple channel audio and corresponding video.
Figure 5:
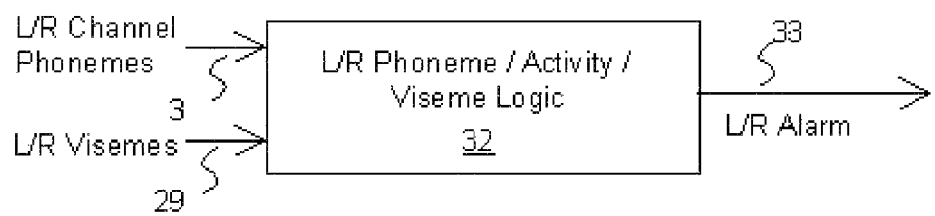
FIG. 5 is a partial diagram of an embodiment of the invention utilized for detecting the loss of proper tracking in a system having multiple channel audio and corresponding video.

FIGS. 4 and 5 show an exemplary embodiment of the invention where image information is used in conjunction with sound information to ensure proper spatial relationships. The system illustrate a scenario of operating with a multiple channel audio input 1. A phoneme/activity detection 2, such as that of FIG. 1 is utilized to provide phoneme and activity information 3 for each input channel. For purposes of illustration the left and right channels will be considered, although the previously described dialogue and surround channel operation example of FIGS. 2 and 3 will be understood to be incorporated as well. The present description however will be limited to the left and right channel operation.

FIG. 4 also shows a video input 25 which is coupled to a viseme detection 26 and a frame spatial location element 30. Viseme detection 26 may operate for example as described in U.S. Patent Application 20070153089. Alternatively the mouth shape or image MUEV detection disclosed in U.S. Pat. No. 7,499,104 may be utilized to detect particular mouth shapes or MUEVs which are appropriate for a given video channel.

Viseme detection 26 outputs visemes via 27 which are coupled to a viseme location operation 28. Frame spatial location 30 operates to output frame left right information via 31. The frame left right signal indicates whether each viseme on 27 is located in the left or right side of the image frame. Viseme location operation 28 receives both the viseme and location information and in response thereto outputs left and right visemes via 29.

Although shown in FIG. 4 as a separate operation 30, the frame left right signal on 31 is a byproduct of the viseme detection operation 26 since when a viseme is found as disclosed in U.S. Patent Application 20070153089 it is known where in the image frame it is located. For example the mouth shapes are found by first locating the face in the frame, then locating the lips in the face and then determining the shape of the lips. It is merely required to convert the precise location of the lips within the frame to a left/right signal by comparing the horizontal address of the viseme to the center point address of the frame.

As a simplified example, if the frame is 1920 pixels wide, the horizontal address of the viseme (e.g. the lips) will range from 0-1919. By comparing that viseme address to 960 to determine which is the larger, the output of that comparison will indicate left (less than 960) or right (960 or greater). Of course in practice the horizontal address of the viseme will be a range of addresses corresponding to the size of the viseme. It is desired to utilize the middle or average address for the comparison. For example if the viseme is 12 pixels wide the address might range from 30 to 42 and the middle address 36 would be compared to 960.

FIG. 5 receives the left and right channel phoneme and activity information via 3 from 2 and the left and right viseme information via 29 from 28. A left and right phoneme/activity/viseme logic operation 32 operates to inspect the location of the visemes on the image frame in comparison to the corresponding phoneme. For example, a left side visemes would be expected to have consistently corresponding phonemes present in the left front audio signal. If however the corresponding phonemes are present in one of the other three channels the audio mistracks.

In FIG. 5, logic 32 illustrates to operate in response to each viseme to identify and spatially locate its corresponding phoneme. It inspects the corresponding audio signal (e.g. if the viseme is in the left of the frame the corresponding audio signal is the left front audio) and if the corresponding phoneme is found it then inspects the remaining channels to see if a corresponding phoneme is found in one or more of them. The outcome of the inspections is noted and the conditions noted. For example a corresponding phoneme is in the right channel and none of the others, or in the right channel and one or more of the others, or not in the right channel but in one or more of the others, or is not found in any of the channels. Inspections are performed for other visemes and the conditions are noted.

Similar to the description of the filter 14 of FIG. 2, the results of the inspections to find corresponding phonemes is also filtered to ensure that there is sufficient activity in the video and audio channels and also recursively filtered to provide a running average of the results. Reporting is provided and alarms may be set in response to the activities and finding of corresponding phonemes. In particular it is desired to set a left right alarm via 33 indicating that left and right channels have been swapped.

It will be recognized from the simplified example that many normal locations of visemes and phonemes can be expected. As one example, a viseme which is located in or near the center of the frame will likely have corresponding phonemes in both left and right audio channels. Accordingly this finding would not indicate any problem. If however the viseme is located in the far left side of the frame and the only corresponding phoneme is found in the right audio there might be a problem. Repeated and consistent problems of this type should lead to the setting of an alarm. Such normal and problem indicating findings are somewhat particular to the type of audio and video systems the invention is practiced with as one of ordinary skill in the art will understand from the teachings herein.

Figure 6:
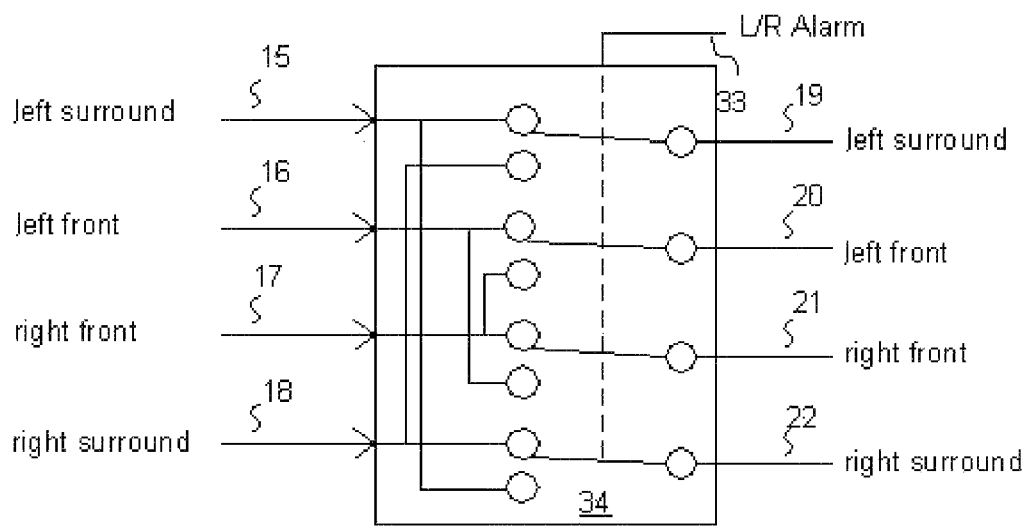
FIG. 6 is a diagram of a circuit to correct mistracking in a system having multiple channel audio.

FIG. 6 shows a double pole double throw switch 34, similar to 24 of FIG. 3. Switch 34 however responds to the left right alarm 33 from 32 and operates to pass the input audio signals 15-18 to the output channels 19-22 if the alarm is not present or to swap left and right channels if the alarm is present.

It will be recognized that the invention may be utilized with a range of audio and video channels, from only one to many audio channels and with one or multiple video channels. For example the invention may be utilized with multiple video channel systems such as 3D and surround video. The invention may be used with only one or with multiple audio channels such as the NHK Super Hi-Vision system with 22.2 audio channels.

In particular the invention may be utilized with surround sound systems where sound may be perceived by the viewer as coming from multiple directions. Visemes are detected and their location relative to the viewer or some other reference(s) determined. The location to the viewer may include both locations of visible image and locations which are not visible such as the previously described scenario where an airplane is visually located behind the viewer and not visible.

Phonemes which correspond to the visemes are then located by searching one or more audio signals. The located phonemes are then identified by their spatial location relative to the viewer (or other reference(s)) in response to the audio channel(s) they are found in. The spatial location of the viseme is compared to the spatial location of the phoneme to determine if they match.

Reporting is performed and/or alarms set in response to the matching or mismatching of the spatial locations of corresponding visemes and phonemes. In instances where the spatial locations of corresponding visemes and phonemes do not match, the audio signals may be coupled to different audio channels in order to provide proper tracking. It is also possible to improve matching of audio and video by use of audio signal processing. For example dialogue may be electronically removed from an audio signal, leaving other sounds in that signal, and that removed dialogue added to one or more other audio signals.

Figure 7:
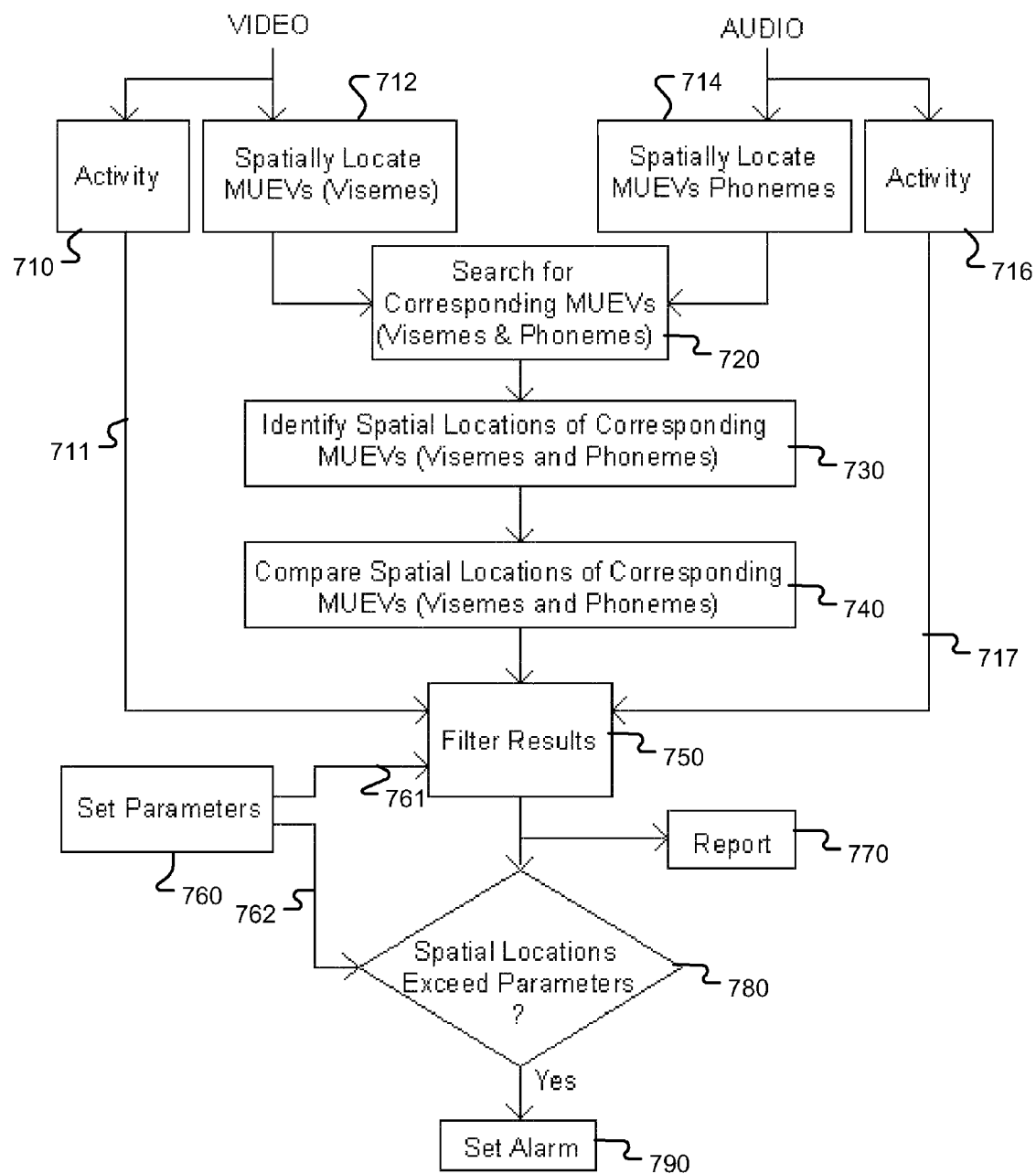
FIG. 7 is a flow chart demonstrating one embodiment of the present invention.

FIG. 7 is a flow chart demonstrating one embodiment of the invention. One or more video signals is inspected to determine activity indicating the likely presence of video MUEVs as shown in block 710, in this example visemes, and also to spatially locate visemes relative to a reference point, as shown in block 712. As described above, activity may be determined in response to the visemes. A plurality of audio signals is inspected to determine activity indication the likely presence of audio MUEVs as shown in block 716, in this example phonemes, and to spatially locate phonemes relative to a reference point, as shown in block 714. Again, activity may be determined in response to phonemes. The phonemes and visemes are searched to locate corresponding pairs or MUEVs, as shown in block 720. The spatial locations of the corresponding MUEVS are identified, as shown in block 730 and those spatial locations are compared to determine their degree of spatial coincidence, as shown in block 740.

Parameters are set, by operator, as shown in block 760 or otherwise, for filtering the results of the determination of the degree of spatial coincidence of the corresponding MUEVs. Parameters may be set during manufacture, for example by programming them into software, storing them in memory, or hard wiring in circuitry. Parameters may also be set and adjusted automatically in response to the audio and/or video signals, for example in response to the average audio level or average audio frequency content.

The results of the determination of the degree of spatial coincidence are filtered in response to the parameters and audio and video activity to determine the average spatial coincidence, as shown in block 750 and a report of the average spatial coincidence is made.

Parameters are set, as shown in block 760 by operator or otherwise, for comparison to the average spatial coincidence to determine excessive values indicating a loss of spatial coincidence. As above the parameters may be set during manufacture or set and adjusted automatically.

The average spatial coincidence is compared to the parameters, as shown in block 7802 to determine if the average spatial coincidence exceeds the parameters and if so an alarm is set, as shown in block 790.

One of ordinary skill in the art will recognize from the teachings of the various embodiment of the Figures which are given by way of example to illustrate the inventive concepts that various changes and enhancements may be resorted to in order to practice the invention in a particular system or with particular equipment.

As generally used in the art, the word audio often, but not always, pertains to sounds likely include dialogue and the signals that carry them. This is a holdover from original radio and TV systems which only had one channel which carried all sounds. Sound is often used more generally to mean audible sounds and the signals that carry them. It is noted however that when used in multiple channel sound systems, audio is now often used to denote any of the sound channels or signals, including those which are intended to carry only sound effects without dialogue. Audio is also used to mean all of the sound channels and signals in a particular program. The embodiment of the invention is described herein in respect to audio, and audio in television systems. The use of terminology including audio and sound in the description of the exemplary embodiment is that commonly used in the art. One of ordinary skill in the art will know the particular meaning intended from the context of the wording, however those not having skill in the art may not be able to know the intended meaning without some study. The embodiment is given by way of example and is not intended to be limiting of the scope of the invention as claimed, and in particular it is not intended that audio or sound be limited to only that which contains dialogue.

Generally, each sound channel conveys an electronic signal representation of the sound. These electronic signals may be analog or digital, and may be conveyed by wire, fiber optic, optical, wireless or any other known method. Several other television and audio systems which utilize multiple sound channels are known in the art and it is expected that other multiple sound channel systems and equipment will become known in the future. The present invention will find application to many of these multiple sound channel systems as well as the associated equipment, transmission systems and methods as will be known to one of ordinary skill in the art from the teachings herein.

It will be appreciated that the word channel, is used herein in a communications theory sense. That channel is the path, whereby signals, information or data are stored, conveyed or transmitted utilizing any of various technologies known in the art.

It will be appreciated that while the embodiment is described with respect to phonemes and dialogue as a desired type of audio signals, the inventive concepts will apply as well to other types of signals. For example the invention may be practiced with audio effects, low frequency audio, electronically generated audio, laugh tracks, applause tracks and any other type of audio signal which is desired to be present and/or carried on one or more particular channel(s). The invention may be practiced by inspection of the signal for expected characteristics of the particular signal.

When speaking of the absence or presence of phonemes, MUEVs or other types of information in a channel, it will be understood that it is the absence or presence of the particular information in the signal (of whatever type) which conveys that information via the channel. Detecting the information in a channel may be performed directly by inspecting the signal carried in the channel. It is also possible to detect the presence of information in that channel indirectly by inspecting the sound from the transducer (e.g. speaker) which converts the signal to sound, such as by using another transducer such as a microphone.

The teachings of the inventive concepts described herein will also be understood by those of ordinary skill in the art to be applicable to non-audio signals being carried as intended for particular systems and methods. Examples include systems and methods which utilize one or more channels of metadata, subsonic, ultrasonic, infrared, ultraviolet or electromagnetic (e.g. X-Ray, Radar, MRI) information.

As used herein, dialogue pertains to spoken words such as by humans, cartoon characters and the like. While in the normal sense dialogue pertains to a two way conversation, as used herein it will encompass a one way conversation such as a radio or television announcer broadcasting to a listener.

As will be known from context, frame and image frame refer to the entire frame of images viewed by a viewer whereas image refers to the particular image or images of interest within (or not within but relative to) the frame. Most commonly image refers to the image which corresponds to the sound being discussed, for example the face of a speaker which is analyzed for visemes and for which the sound is being analyzed for phonemes. That face may be in the frame or not, such as when a person in the frame is looking at the speaker which is talking but cannot be seen by the viewer.

When describing actions and activities such as detection and/or response to phonemes, MUEVs, visemes and the like, it is meant that there is a specific detection or response which more readily results from the occurrence of that particular event than other events. For example, while an activity detector responding to a particular frequency band would inherently respond to a phonemes falling within that band, it has no particular discrimination of or affinity to the phoneme as compared to other sounds falling within the band. Thus, as used herein such an activity detector would not be considered to detect or respond to the phoneme.

What is claimed is:

1. A method of dialogue tracking for a plurality of audio signals including at least one dialogue audio signal carrying speech of a person with each audio signal being carried by an audio channel having an intended spatial location of the sound it carries relative to the person, the method comprising:
   receiving and detecting audio characteristics and determining a count of phonemes in a time window for at least one of the plurality of audio signals;
   identifying said audio characteristics which correspond to dialogue;
   determining dialogue tracking based on the intended spatial location of the audio channel carrying said at least one audio signal including;
   if said count of phonemes in the time window is taken from a non-dialogue channel and exceeds a first threshold, or if said count of phonemes in the time window is taken from a dialogue channel and is lower than a second threshold, performing an action consisting of one or more of a report, an alarm or a correction in response to said determining dialogue tracking.

2. The method of dialogue tracking of claim 1, wherein the audio characteristics are selected from a group consisting of phonemes corresponding to a plurality of vowels and a combination of phonemes and activity.

3. The method of dialogue tracking of claim 1 further comprising reporting results of the determining dialogue tracking for a plurality of selected audio signals.

4. The method of dialogue tracking of claim 1 further comprising generating alarm based on the corresponding spatial location of the identified audio characteristics of at least one audio signals.

5. The method of dialogue tracking of claim 1 further comprising switching a plurality of audio signals from their original channel to the correct channel for those audio signal for which dialogue tracking is determined to be false.

6. The method of dialogue tracking of claim 1, wherein the detecting audio characteristics is based on a method of detecting audio dialogue and image MUtual EVent (MUEV) characteristics.

7. The method of dialogue tracking of claim 6, wherein the audio MUEV characteristics comprise phonemes corresponding to vowels, phonemes corresponding to consonants, and non-phoneme audio characteristics.

8. The method of dialogue tracking of claim 1, wherein the detecting phonemes is based on a method of detecting audio MUtual EVent (MUEV) characteristics for selected audio signals and corresponding images.

9. The method of dialogue tracking of claim 8, wherein the audio MUEV characteristics comprises phonemes corresponding to vowels.

10. The method of dialogue tracking of claim 9, wherein the phonemes corresponding to vowels comprises A, E and O.

11. The method of dialogue tracking of claim 9, wherein the audio MUEV characteristics further comprises phonemes corresponding to non-vowels.

12. The method of dialogue tracking of claim 11, wherein the phonemes corresponding to non-vowels comprises M, P, B, N and S.

13. The method of dialogue tracking of claim 2, wherein the detecting activity is based on a number of one or more types of phonemes detected during a period of time, wherein the activity is detected if the number is greater than a threshold.

14. The method of dialogue tracking of claim 2, wherein the detecting activity is based on a method of determining significant energy in frequency bands corresponding to spectrum of normal voice sounds.

15. The method of dialogue tracking of claim 8, wherein the audio MUEV characteristics are provided for the determining dialogue tracking.

16. The method of dialogue tracking of claim 14, wherein the activity corresponding to presence of the significant energy in the frequency bands corresponding to the spectrum of the normal voice is provided for the determining dialogue tracking.

17. The method of dialogue tracking of claim 1 further comprising a step of recursively filtering the result of dialogue tracking.

18. A method of dialogue tracking for a sound portion corresponding to a video signal in an electronic system carrying an image intended to be displayed to a viewer with an associated plurality of audio signals, each of which is audio signal is carried by a channel corresponding to the intended spatial location of the sound of the audio signal being carried thereby relative to the displayed image, including at least one dialogue and at least one surround channels, the method comprising:
    receiving and detecting audio characteristics for each of the plurality of audio signals;
    determining viseme spatial locations as being present in the image which is displayed to the viewer; and
    determining dialogue tracking based on the intended spatial location(s) of sound corresponding to the identified audio characteristics for the plurality of audio signals and the determined viseme spatial locations being present in the displayed image including determining a count of phonemes in a time window for at least one of the plurality of audio signals and analyzing said count of phonemes and performing an action consisting of one or more of a report, an alarm or a correction when an insufficient number of phonemes is less than a threshold and/or an excessive number of phonemes is greater than a threshold are counted in the time window.

19. The method of dialogue tracking of claim 18, wherein the detecting audio characteristics is based on a method of detecting audio MUtual EVent (MUEV) characteristics for selected audio signals.

20. The method of dialogue tracking of claim 19, wherein the detecting of visemes is based on a method of detecting image MUEVs.

21. The method of dialogue tracking of claim 20, further comprising a step of identifying correspondence between the audio MUEV characteristics and the image MUEVs.

22. The method of dialogue tracking of claim 21 further comprising a step of determining one or more spatial location corresponding to the audio MUEV characteristics.

23. The method of dialogue tracking of claim 22 further comprising a step of determining one or more spatial location corresponding to the image MUEV characteristics.

24. The method of dialogue tracking of claim 23, further comprising a step of comparing the spatial locations of the corresponding audio MUEV characteristics and image MUEVs.

25. The method of dialogue tracking of claim 18 further comprising a step of recursively filtering result of dialogue tracking.

26. A method of dialogue tracking for a video signal carrying an image and a related plurality of audio signals carried by audio channels, including at least one dialogue channel and at least one surround sound channel, said channels having corresponding spatial locations relative to the image frame, the video image and related plurality of audio signals having MUEVs, the method comprising:
    receiving and detecting audio MUEVs for at least one of the plurality of audio signals;
    detecting video image MUEVs for the image;
    determining dialogue tracking based on the corresponding spatial location of the audio channel of the detected audio MUEVs and the presence in the image frame of the video MUEVs which correspond to the detected audio MUEVS;
    determining a count of phonemes in at least one surround channel signal in a time window;
    determining a count of phonemes in at least one dialogue channel signal in a time window; and
    if the count of phonemes in said dialogue channel signal in the time window is less than the count of phonemes in said surround channel, provide an indication of mistracking.

27. The method of claim 26, further comprising:
    if the count of phonemes in the surround sound channel audio in the time window exceeds a threshold quantity, switching the signal in said surround sound channel with at least one dialogue channel signal.

28. The method of claim 26, further comprising:
    if the count of phonemes in said dialogue channel signal in the time window is less than the count of phonemes in said surround channel, switch said dialogue channel signal and said surround channel signal.

29. The method of claim 26, further comprising:
- determining and reporting a count of phonemes in a dialogue sound channel signal in a time window; and
- determining and reporting the presence of audio in the speech frequency range.

30. The method of claim 26, further comprising:
- determining the corresponding spatial location of video image visemes;
- determining the corresponding audio phonemes carried by the left dialogue channel audio;
- determining the corresponding audio phonemes carried by the right dialogue channel audio;
- matching one or more video image viseme to corresponding audio phonemes from the left and/or right dialogue channel;
- comparing the spatial location of image visemes to the corresponding audio phonemes from the left and/or right dialogue channel to determine if image visemes from the left or right of the image frame correspond to audio phonemes from the left or right dialogue channel.

\* \* \* \* \*